United States Patent [19]

Sakamoto et al.

[11] 4,338,780
[45] Jul. 13, 1982

[54] METHOD OF COOLING A GAS TURBINE BLADE AND APPARATUS THEREFOR

[75] Inventors: Takeshi Sakamoto; Shunichi Anzai; Nariyoshi Kobayashi; Ryoichiro Oshima, all of Ibaraki, Japan

[73] Assignee: Hitachi, Ltd., Tokyo, Japan

[21] Appl. No.: 964,632

[22] Filed: Nov. 29, 1978

[30] Foreign Application Priority Data

Dec. 2, 1977 [JP] Japan .................. 52-143870

[51] Int. Cl.³ .................................. F02C 7/18
[52] U.S. Cl. .................. 60/39.05; 60/39.53; 60/728; 415/114; 416/96 R; 416/97 R
[58] Field of Search ............. 60/39.05, 39.53, 728; 415/114; 416/96 R, 97 R

[56] References Cited

U.S. PATENT DOCUMENTS

| | | | |
|---|---|---|---|
| 2,654,220 | 10/1953 | Boestad et al. | 60/728 |
| 3,280,555 | 10/1966 | Charpentier et al. | 60/39.53 |
| 3,446,481 | 5/1969 | Kydd | 416/96 R |
| 3,849,025 | 11/1974 | Grondahl | 416/97 R |
| 3,856,433 | 12/1974 | Grondahl et al. | 416/96 R |
| 3,936,227 | 2/1976 | Wojclk | 416/97 R |
| 3,949,549 | 4/1976 | Holl | 60/728 |

FOREIGN PATENT DOCUMENTS 48-25441 6/1973 Japan.
50-73012 2/1975 Japan.

OTHER PUBLICATIONS

"Hot Turbines", *Flight*, Mar. 16, 1956, p. 293.

*Primary Examiner*—Robert E. Garrett
*Attorney, Agent, or Firm*—Craig and Antonelli

[57] ABSTRACT

Part of high-pressure air is extracted from the vicinity of the final stage of a compressor and is introduced into a water spraying chamber, and water at the normal temperature is injected into the high-pressure air from a nozzle installed in the water spraying chamber, to prepare a cooled coolant. The coolant sometimes contains water drops. The cooled coolant is fed into coolant passageways which are provided inside a moving blade in a manner to extend from the root part to the tip of the moving blade. When the coolant passes through the passageways, the moving blade is cooled by the coolant, and after the cooling, the coolant is emitted into a turbine main gas passageway. In case where the water drops are contained in the coolant, they vaporize during the cooling of the moving blade, to cool the air of the coolant, to suppress the temperature rise of the coolant and to enhance the cooling effect.

10 Claims, 4 Drawing Figures

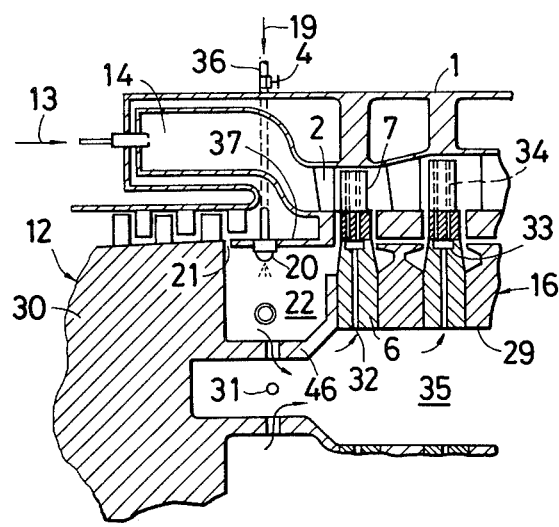
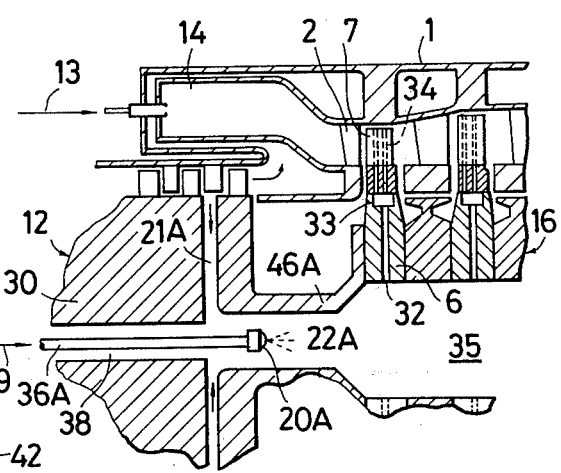
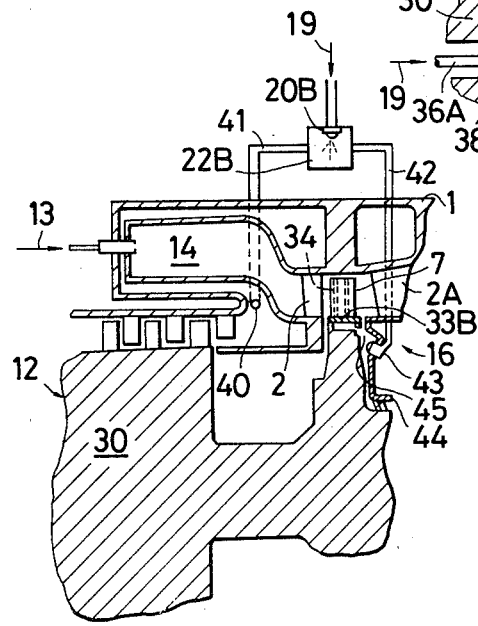

METHOD OF COOLING A GAS TURBINE BLADE AND APPARATUS THEREFOR

BACKGROUND OF THE INVENTION

This invention relates to a method of cooling a gas turbine blade and a cooling structure therefor. More particularly, it relates to a cooling method and a cooling structure of the open circuit type which exploits liquid in a moving blade of a high-temperature gas turbine.

The thermal efficiencies of gas turbines are enhanced by raising the temperature or pressure of a gas at a turbine inlet. In gas turbines presently put into practical use, the system of cooling blades with air is adopted, and the operating temperature is deemed to be limited to 1,100°–1,200° C. In order to operate the gas turbine at a still higher temperature, it is necessary to employ a coolant of greater cooling effect (in general, water). Although a blade cooling method employing water as the coolant has not been put into practical use yet, several proposals have been made. An example is described in Japanese Patent Application Publication No. 48-25441. In this example, water is introduced from outside a turbine casing into a nozzle which is disposed in a manner to extend towards the root part of a moving blade fitted in the outer periphery of a disc, the water is injected from the nozzle to the root part of the moving blade, and the injected water passes through coolant passageways provided in the moving blade and is emitted from the tip of the moving blade. Although such a cooling method is advantageous in being good in the heat transfer performance and great in the cooling effect, it has various problems. More specifically, the root part of the moving blade and a casing part surrounding the moving blade are eroded and damaged by the water drops injected from the nozzle and by the unvaporized water drops emitted from the tip of the moving blade, respectively. In case where any excess liquid has been supplied, the unvaporized liquid emitted from the tip of the moving blade deprives the high-temperature operating gas of large amounts of heat for vaporization, to lower the temperature of the operating gas and to degrade the output of the gas turbine. On the other hand, in case where the supply of the water has stopped even temporarily, the temperature of the blade rises suddenly because the coolant consists only of the water supplied from the nozzle. Then, the blade will break due to an insuficient strength, or the operation of the turbine cannot but be stopped. Furthermore, since the blade is at a high temperature, it is liable to film boiling. In order to prevent the film boiling, large quantities of water must .e caused to flow through the coolant passageways in the blade at high speed. This results in emitting the unvaporized liquid drops as stated above, and brings about the problem of erosion.

Besides, there has been known a system wherein, as disclosed in Japanese Patent Application Laying-open No. 50-73012, air and water are introduced into the interior of a blade by separate conduits and are injected with their nozzle portions arranged so as to oppose to the inner surface of the blade to be cooled. In this system, the distance from the coolant injecting ports to the inner surface of the blade being the surface to-be-cooled is short, and a homogeneous atomized coolant is difficult to be obtained. Moreover, the air and the liquid have different specific gravities. Especially in a centrifugal field, the liquid of greater specific gravity is prone to be pushed in the direction opposite to the rotating direction of the blade and flow separately from the air on account of Coriolis's force. The liquid strikes and cools the portion to-be-cooled, and the cooling effect varies greatly between the suction and pressure sides of the blade. Therefore, a sharp temperature gradient arises in the material of the blade. This leads to increase in the thermal stress, and has the possibility of shortening the lifetime of the blade. Since, in this system, the liquid strikes and cools the vane, there is the possibility of the occurrence of the erosion as described previously.

Further pertinent prior arts are described in U.S. Pat. Nos. 3,849,026; 3,856,423; and 3,936,227. They bear resemblance to this invention in point of the cooling of blades.

SUMMARY OF THE INVENTION

An object of this invention is to provide a method of cooling a high-temperature gas turbine blade that has a high degree of safety and a great cooling effect, and a cooling structure therefor.

Another object of this invention is to provide a method of cooling a high-temperature gas turbine blade which has a high degree of safety and is capable of enhancing an output, and a cooling structure therefor.

Still another object of this invention is to provide a method of cooling a high-temperature gas turbine blade which has a high degree of safety and can readily vary the extent of cooling, and a cooling structure therefor.

This invention is characterized in that water is injected into compressed air extracted from a compressor, to prepare air cooled by the injected water, and that the air is introduced into the interior of a moving blade of a high-temperature gas turbine, to cool the moving blade.

The high-temperature and high-pressure air from the compressor to be used for the cooling of the moving blade is cooled by the sprayed water drops into the low-temperature coolant before being introduced into the interior of the moving blade, whereupon the coolant is introduced thereinto. In the moving blade, the water drops contained in the coolant vaporize to cool the air, and the temperature of the coolant is suppressed. With the air, therefore, the necessary cooling of the moving blade can be satisfactorily carried out. The extent of the cooling of the moving blade can be easily regulated by adjusting the quantity of the water drops contained in the air of the coolant. The coolant is gaseous, and no water impinges on the moving blade or any other part, so that any damage ascribable to erosion is not feared.

BRIEF DESCRIPTION OF THE DRAWINGS

FIG. 1 is a sectional view which shows an embodiment of a structure according to this invention for cooling the moving blade of a high-temperature gas turbine, FIGS. 2 and 3 are sectional views each of which shows another embodiment of the structure according to this invention for cooling the moving blade of a high-temperature gas turbine.

DESCRIPTION OF THE PREFERRED EMBODIMENTS

Figure 4:
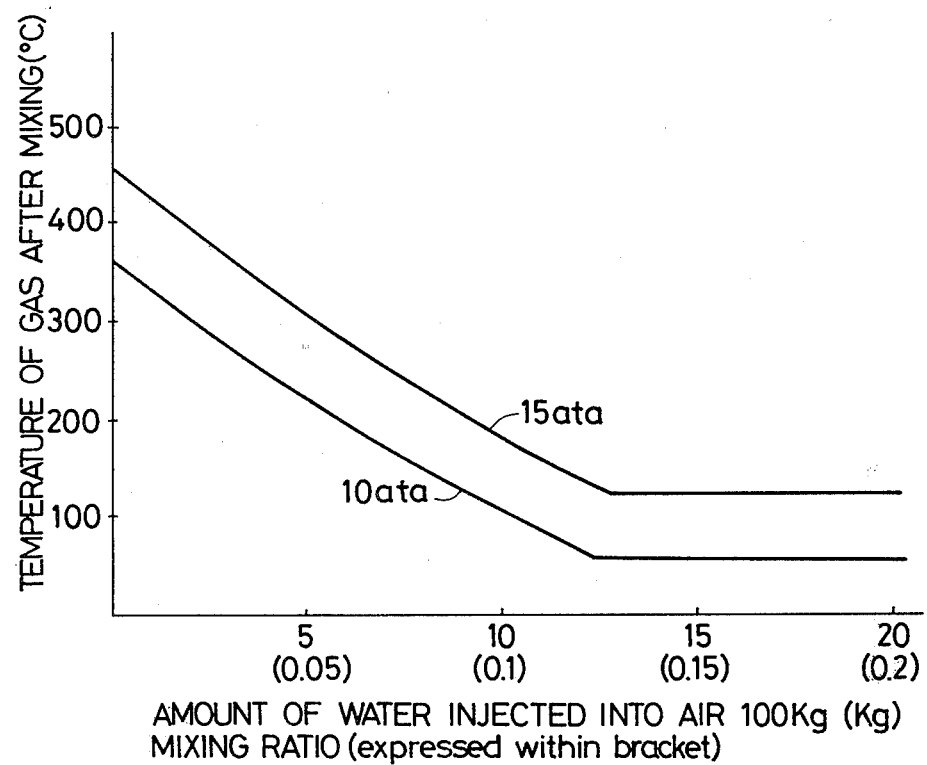
FIG. 4 is a graph which shows the relationship between the temperature of compressed air and the quantity of water added to the air.

Hereunder, embodiments of the structure and method according to this invention for cooling the moving blade of a high-temperature gas turbine will be described in detail with reference to the drawings.

In FIG. 1, a rotor 30 of a compressor 12 is integrally coupled with a rotor 29 of a turbine 16, and a cylindrical cavity 35 extending to the turbine rotor 29 is provided in a central part of the rotor 30. In that part of the compressor rotor 30 which adjoins the turbine 16, an annular water spraying chamber 22 is formed at the outer periphery of the cavity 35 by an annular stationary wall 37 and an annular portion 46 of the rotor. The water spraying chamber 22 communicates with the vicinity of the final stage of the compressor 12 through a gap 21, and communicates with the cavity 35 through a plurality of apertures 31. In the stationary wall 37 surrounding the spraying chamber 22, a nozzle 20 is disposed in a manner to protrude into the chamber 22. This nozzle 20 communicates with a water reservoir (not shown), and is mounted on a water pipe 36 with a valve 4. Most of high pressure air emergent from the final stage of the compressor 12 is fed to a combustor 14, and fuel 13 burns into a combustion gas, which is introduced into a cascade of the turbine 16. The cascade exists within a casing 1, and it includes a stator vane 2 which is fixed to the casing 1 and a moving blade 7 which is fixed to a disc 6 of the rotor and which rotates with the rotor. The rotor is rotated upon passage of the combustion gas through the cascade, and the energy of the combustion gas is taken out as a turning force. The disc 6 of the turbine rotor 29 is provided with a plurality of coolant supplying apertures 32 which extend radially and which communicate with a header 33 in a place contacting with a root part of the blade. The upper end of the header 33 is the bottom surface of the moving blade 7 mounted on the disc 6, and a plurality of coolant passageways 34 are provided in the moving blade in a manner to extend from the bottom surface of the moving blade to a blade tip. Thus, a coolant from the header 33 is emitted into a combustion gas passageway or main gas passageway through the passageways 34. Such coolant passageways 32, 33, 34 are disposed in all the stages requiring cooling.

While most of the air compressed by the compressor 12 is fed to the combustor 14, part of the air is extracted through the gap 21 near the final stage of the compressor 12 and is fed into the water spraying chamber 22 for the cooling use. On the other hand, cooling water 19 is fed to the nozzle 20 through the water pipe 36 which communicates with a water is sprayed into the water spraying chamber 22 by the nozzle 20, as very small water drops, which mix uniformly with the air to cool the air. As indicated by way of example in FIG. 4, when air at the normal temperature and under the normal pressure is compressed into 15 atm. and 10 atm. by the compressor 12, its temperature becomes about 455° C. and 364° C. respectively. When water at approximately the normal ambient temperature (at 20° C.) is sprayed and mixed thereinto, the temperature of the mixed coolant lowers with the quantity of the water added to the air, i.e., as the mixing ratio increases. When the mixing ratio becomes about 0.13, water droplets come to remain in the air of the coolant. When the mixing ratio is raised beyond the particular mixing ratio, the quantity of the water droplets increases but the temperature fall of the coolant becomes very gentle. In this case, the temperature of the mixed coolant becomes a saturation temperature corresponding to the partial pressure of steam. The quantity of the water to be sprayed varies depending on the turbine inlet temperature of the combustion gas. By regulating the valve 4, it is possible to cause the coolant air to contain an appropriate amount of water droplets. At some values of the gas turbine inlet temperature, a mixed coolant (consisting of air and steam) which has been cooled by water droplets and which contains no water droplet can be employed for the cooling of the moving blade. The coolant thus prepared is fed into the cavity 35 through the plurality of apertures 31. The coolant in the cavity 35 is emitted into the main gas or combustion gas through the passageway 32 in the disc 6, header 33 and the coolant passageways 34 in the moving blade. When the coolant passes through the coolant passageways 34, it deprives the moving blade 7 of heat and cools it. Simultaneously, the water droplets contained in the air of the coolant vaporize, and the temperature of the air as well as the steam rises. This temperature rise is considerably suppressed because the water droplets of the coolant vaporize.

The stream of the coolant is easily secured owing to such facts that the pressure is raised by the compressor, that the main gas pressure when passing through the turbine vanes has its static pressure lowered by a pressure loss in the combustor 14 as well as the turbine stator vane and the conversion into a dynamic pressure, and that a centrifugal force is bestowed by the high-speed rotation of the disc 6 as well as the moving blade 7.

According to such a construction, the quantity of water contained in the coolant is extremely smaller especially with respect to a coolant which is fully composed of water. Owing to the small quantity of water, almost all the water content vaporizes inside the moving blade, and no water droplets are included in the coolant which is emitted from the blade tip into the main gas, so that the temperature of the main gas is not lowered sharply. The temperature rise of the coolant is small because of the utilization of the vaporization phenomenon of water, and a sufficient cooling effect is attained. Furthermore, the water droplets do not collide against the turbine structure at high speed, so that damage due to erosion is not a problem and that a long-life operation is possible.

As the result of a heat transfer experiment, it has been determined that the heat transfer coefficient in the case of employing the air-water mixture coolant is 3 to 10 times as large as that in the case of using a coolant composed only of air, for mixing ratios of approximately 0.1 to 0.4. With the low temperature of the mixed coolant taken into account, the cooling effect is very great.

Now, another embodiment will be described with reference to FIG. 2. In the present embodiment, the cooling air is extracted from a gap for extraction 21A in the vicinity of the final stage of the compressor 12. It is introduced into a hollow portion 38 provided in the central part of the rotor 30 of the compressor 12, and is further led into a water spraying chamber 22A communicating with the hollow portion. A water conduit 36A is introduced into the water spraying chamber 22A through the hollow portion 38 of the central rotor part from the compressor side, and a nozzle 20A is mounted on the fore end of the water conduit. In the water spraying chamber, the cooling water 19 is injected into the cooling air as stated previously. The cooling air shifts into the cavity 35, passes through the coolant supplying apertures 32 provided in the disc 6 of the turbine, and cools the moving blade 7. With the present embodiment, the same effects as in the preceding embodiment are achieved.

Still another embodiment is shown in FIG. 3. In this embodiment, part of the compressed air is extracted by an air extracting pipe 41 and from a cooling air taking-out port 40 provided in the vicinity of the outlet of the compressor 12, and it is led into a water spraying chamber 22B. In the water spraying chamber 22B, the cooling water 19 is injected into the extracted air by a nozzle 20B so as to cool the air and to cause very small water drops to float. The air under this state is caused to penetrate through the casing 1 and further pass through the interior of a stator vane 2B by means of a coolant conduit 42, whereupon it is led to a spraying nozzle 43 installed on a diaphragm 44. The cooling air containing the water droplets is injected towards the root part of the moving blade 7 by the spraying nozzle 43, it passes through a passageway 45 provided in the root part of the moving blade and leads to a header 33B, and passes from the header through the coolant passageways 34 provided in the moving blade 7 and cools this moving blade. After the cooling, the cooling air is emitted into the main gas as in the foregoing. In the present embodiment, the state of the coolant cooling the blade is the same as in the preceding two embodiments, and the cooling effect is substantially the same. Although the coolant is injected from the spraying nozzle 43 to the root part of the blade, the absolute value of the water content of the cooling air is much smaller than in the coolant composed only of water, and there is hardly the fear of erosion.

In the above, the embodiments have been described in detail. According to this invention, the cooling air has water sprayed and injected thereinto before being introduced into the moving blade, whereby it is cooled into a low temperature and it contains water droplets. Therefore, the cooling of the blade is chiefly executed by the cooling air with its temperature rise suppressed by the vaporization phenomenon, and a great cooling effect is attained. The blade can endure a turbine inlet temperature of about 1,500° C. On the other hand, the water droplets are not emitted into the main gas, so that the erosion attributed to the water droplets is not feared and that the temperature of the main gas is not lowered by the vaporization of the water droplets, either. Further, even in an emergency in which the supply of the cooling water has stopped, the stream of the cooling air is continually secured, and an abrupt temperature rise of the blade can be prevented.

The water-air mixture coolant according to this invention has water and air mixed before being supplied to the vane, so that one sort of coolant supplying passageways suffices. Since the distance to the blade is long, a homogeneous mixture coolant is obtained, and a uniform cooling of the blade is possible. On the other hand, with the coolant composed only of water, the temperature becomes the saturation temperature of the pressure of the coolant at the time of vaporization. In contrast, when the water in the mixed coolant of this invention vaporizes, the temperature becomes the saturation temperature corresponding to the partial pressure of the water vapor in the mixed coolant. This temperature has a small value, and the temperature of the blade is suppressed to be low.

What is claimed is:

1. A method of cooling a moving blade of a gas turbine in which high-pressure air from a compressor is passed through a combustor to make it a combustion gas, the combustion gas is introduced into a main gas passageway with a cascade including the moving blade disposed therein, and power is taken out by expansion of the combustion gas, comprising the steps of:
extracting part of the high-pressure air from the compressor in order to use it for cooling;
spraying water into the extracted air, and mixing water drops with the air and cooling said air, to prepare a coolant for cooling the moving blade;
introducing said coolant into coolant passageways inside said moving blade, to cool said moving blade; and
emitting into the main gas passageway said coolant having cooled said moving blade, wherein the step of spraying water and preparing said coolant is performed in a water spraying chamber located outside a shaft between a final stage portion of said compressor and a disc of a first stage of said turbine by a nozzle communicating with a water pipe and mounted to a stationary wall on a radially outer side of the turbine.

2. A method of cooling a blade of a gas turbine as defined in claim 1, wherein in the step of preparing said coolant, the water is sprayed so that a mixing ratio of said water relative to the air may become 0.1 to 0.4 in a weight ratio.

3. A method of cooling a moving blade of a gas turbine in which high-pressure air from a compressor is passed through a combustor to make it a combustion gas, the combustion gas is introduced into a main gas passageway with a cascade including the moving blade disposed therein, and power is taken out by expansion of the combustion gas, comprising the steps of:
extracting part of the high-pressure air from the compressor in order to use it for cooling;
spraying water into the extracted air, and mixing water drops with the air and cooling said air, to prepare a coolant for cooling the moving blade;
introducing said coolant into coolant passageways inside said moving blade, to cool said moving blade; and
emitting into the main gas passageway said coolant having cooled said moving blade, wherein said step of introducing coolant into passages inside the moving blade is performed by supplying said coolant through a cavity portion formed in a central part of a rotor of the compressor, a hole provided in a disc of the turbine that communicates with said cavity portion and a header which communicates with said coolant passageways of said moving blade.

4. A method of cooling a blade of a gas turbine as defined in claim 3, wherein, in the step of preparing said coolant, the water is sprayed so that a mixing ratio of said water relative to the air may become 0.1 to 0.4 in a weight ratio.

5. A method of cooling a blade of a gas turbine as defined in claim 1 or 2 or 4, wherein in the step of preparing said coolant, water at approximately the normal ambient temperature is sprayed so that water drops may be contained in the coolant cooled by the spraying of the water.

6. A method of cooling a moving blade of a gas turbine according to claim 1, wherein said step of introducing coolant into passages inside the moving blade is performed by supplying said coolant through a cavity portion formed in a central part of a rotor of the compressor, a hole provided in a disc of the turbine that communicates with said cavity portion and a header which communicates with said coolant passageways of said moving blade.

7. A method according to claim 1, wherein air is extracted during said extracting step through a gap between an annular portion of a rotor of the compressor and said stationary wall, said gap communicating with the vicinity of a final stage of said compressor and said water spraying chamber.

8. A structure for cooling a moving blade of a gas turbine in which high-pressure air from a compressor is passed through a combustor to make it a combustion gas, the combustion gas is introduced into a main gas passageway with a cascade including the moving blade disposed therein, and power is taken out by expansion of the combustion gas, comprising:

a water spraying chamber for spraying water into air extracted from the compressor, to prepare a cooled coolant;

an air passageway for introducing the air from a final stage of said compressor into said water spraying chamber;

a nozzle which is disposed in said water spraying chamber and which communicates with a water source through a water pipe;

a first coolant passageway which is provided in the moving blade of the turbine in order to cool it, and which is provided with an inlet on a turbine disc side and with an outlet for outflow of said coolant from the main gas passageway on the opposite side in a radial direction; and a second coolant passageway for communicating said water spraying chamber and said inlet of said first coolant passage provided in said moving blade of said turbine, wherein said water spraying chamber is provided outside a shaft between the final stage portion of said compressor and a disc of a first stage of said turbine, and said nozzle communicating with said water pipe is introduced from outside a casing and is installed on a stationary wall on a radially outer side of the turbine.

9. A structure for cooling a blade of a gas turbine as defined in claim 8, wherein said second coolant passageway consists of a cavity portion formed in a central part of a rotor, a hole provided in the disc and communicating with said cavity portion, and a header.

10. A method according to claim 6 or 3, wherein said header communicates with said coolant passageways in said moving blade via an inlet on a turbine disc side of the blade, and wherein said emitting step is performed via an outlet of said coolant passageways located on a radially opposite side thereof.

* * * * *